US006135633A

United States Patent [19]
DiMarco et al.

[11] Patent Number: 6,135,633

[45] Date of Patent: Oct. 24, 2000

[54] METHOD FOR THERMALLY CALIBRATING CIRCUIT BREAKER TRIP MECHANISM AND ASSOCIATED TRIP MECHANISM

[75] Inventors: Bernard DiMarco, Lilburn; Robert G. Bergman, Lawrenceville; David A. Leone, Lilburn, all of Ga.; Christoph Hamann, Kirchheim, Germany

[73] Assignee: Siemens Energy & Automation, Inc., Alpharetta, Ga.

[21] Appl. No.: 09/498,216

[22] Filed: Feb. 4, 2000

Related U.S. Application Data

[62] Division of application No. 08/940,475, Sep. 30, 1997, Pat. No. 6,030,114.

[51] Int. Cl.[7] .......................... H01H 37/12; G01N 25/34; G01K 15/00; B23K 9/00

[52] U.S. Cl. ................................ 374/1; 337/360; 219/68; 374/205

[58] Field of Search .................................... 337/129, 323, 337/327, 347, 368, 360; 219/68; 374/1, 2, 121, 130, 132, 205

[56] References Cited

U.S. PATENT DOCUMENTS

| | | | |
|---|---|---|---|
| 3,566,327 | 2/1971 | Gryctko | 337/77 |
| 3,953,812 | 4/1976 | Heft et al. | 335/25 |
| 4,825,186 | 4/1989 | Bayer | 374/2 |
| 4,859,075 | 8/1989 | Sutter et al. | 374/2 |
| 5,008,645 | 4/1991 | Mrenna | 337/70 |
| 5,126,708 | 6/1992 | Palaia et al. | 335/35 |
| 5,317,471 | 5/1994 | Izoard et al. | 361/105 |
| 5,707,146 | 1/1998 | Gaus et al. | 374/1 |
| 5,821,485 | 10/1998 | Singer et al. | 200/17 R |
| 5,894,259 | 4/1999 | Kolberg et al. | 337/333 |

OTHER PUBLICATIONS

European Search Report dated Nov. 17, 1999.

*Primary Examiner*—G. Bradley Bennett
*Assistant Examiner*—Gail Verbitsky

[57] ABSTRACT

A method for adjusting the calibration of a circuit breaker trip mechanism including a terminal element, a bimetal element connected thereto, and a trip bar. Laser energy is applied to lanced or pre-bent surfaces of the terminal element to thermally induce displacement thereof and thereby modify a trip distance between the bimetal element and the trip bar. Where a laser beam is directed to fall on a middle leg of a lanced or pre-bent section of the terminal element, the bimetal element moves in one direction relative to the trip bar. Conversely, where a laser beam is directed to fall on lateral legs of the lanced or pre-bent section of the terminal element, the bimetal element moves in an opposite direction relative to the trip bar. Thus, laser energy may be applied from the same direction, or to the same side of the trip structure, regardless of whether the trip time is to be increased or decreased.

22 Claims, 5 Drawing Sheets

| | INT. ZONE 1 | INT. ZONE 2 | INT. ZONE 3 | INT. ZONE 8 | INT. ZONE 9 |
|---|---|---|---|---|---|
| Q=16J<br>Q=32J | 90 | 140 | 360<br>520 | 340<br>510 | 280<br>480 |

| | INT. ZONE 6 | INT. ZONE 7 |
|---|---|---|
| Q=16J<br>Q=32J | 30<br>80 | 40<br>100 |

| | INT. ZONE 4 | INT. ZONE 5 | INT. ZONE 10 | INT. ZONE 11 |
|---|---|---|---|---|
| Q=16J | 370 | 160 | | |
| Q=32J | 560 | | 520 | 520 |

METHOD FOR THERMALLY CALIBRATING CIRCUIT BREAKER TRIP MECHANISM AND ASSOCIATED TRIP MECHANISM

This is a divisional, of application Ser. No. 08/940,475 filed Sep. 30, 1997, now U.S. Pat. No. 6,030,114.

BACKGROUND OF THE INVENTION

This invention relates to a method for adjusting the calibration of a circuit breaker trip mechanism. More particularly, this invention relates to a method for thermally calibrating a bimetal trip mechanism of a circuit breaker. This invention also relates to a circuit breaker trip mechanism produced by the method.

Circuit breakers have movable contact elements and operating mechanisms for protecting an electrical circuit from such undesirable conditions as current overload and short circuiting. Generally, a trip mechanism having a bimetal element is provided for controlling the position of a toggle switch and concomitantly the engagement of the movable contact elements. The bimetal element is part of a trip structure which moves relative to a trip bar in dependence on the amount of current flow. Higher current differentially increases temperature in the bimetal element and causes a displacement towards the trip bar. Sufficiently high current causes trip bar actuation and circuit breaking. A set screw is typically provided in the trip structure to adjust the rest position of the bimetal element relative to the trip bar. However, the trip distance is sometimes improperly set owing to variations in the manufacturing process.

OBJECTS OF THE INVENTION

An object of the present invention is to provide a method for calibrating or adjusting the calibration of a circuit breaker trip mechanism.

A more specific object of the present invention is to provide such a method which is utilizable to adjust the calibration of the trip mechanism of a substantially assembled circuit breaker.

Another object of the present invention is to provide such a method wherein a trip structure including a bimetal element and a terminal element is operated upon from the same side regardless of whether a distance between the bimetal element and a trip bar is to be increased or decreased.

Yet another object of the present invention is to provide such a method which is inexpensive to implement.

A further object of the present invention is to provide a circuit breaker trip mechanism which is calibrated or adjusted by the method of the invention.

These and other objects of the invention will be apparent from the drawings and descriptions herein.

SUMMARY OF THE INVENTION

A method for adjusting the calibration of a bimetal trip mechanism of a circuit breaker comprises, in accordance with the present invention, providing a circuit breaker trip structure including a bimetal element connected to a terminal element and applying laser energy to the trip structure at a predetermined location thereon to thermally induce displacement of the trip structure and thereby modify a trip distance between the trip structure and a trip bar of the trip mechanism.

Generally, it is contemplated that the application of the laser energy generates concentrated heat in a selected portion of the trip structure. The heat softens or perhaps melts the region to which the laser energy is applied. As the heated region cools or hardens, it contracts, thereby producing a change in the configuration and/or position of the trip structure and a concomitant change in the distance between the trip structure, i.e., the bimetal element, and the trip bar.

In a preferred embodiment of the invention, the terminal element has lanced or pre-bent legs, and the laser energy is directed onto a portion of a preselected one of the lanced or pre-bent legs. Generally, a first lanced or pre-bent leg of the terminal element is flanked by two second lanced or pre-bent legs having a substantially identical geometric configuration. Applying laser energy to the central lanced or pre-bent leg shifts the bimetal element in one direction, while applying laser energy to the lateral lanced or pre-bent legs shifts the bimetal element in the opposite direction. Generally, the laser energy is directed to fall on a straightened section of the preselected leg, between two bent portions of the leg. This application of laser energy causes contraction of the preselected leg relative to one or two other legs of the terminal element and induces a change in an angle subtended between the bimetal element and the terminal element. The laser energy may be applied from the same direction, or to the same side of the trip structure, regardless of whether the trip time is to be increased or decreased.

Accordingly, where two circuit breaker poles are provided (for example, in a single circuit breaker housing or in two different housings in an assembly manufacturing process), laser energy is applied to a trip structure of one circuit breaker pole at a first surface thereof to thermally induce displacement of that trip structure to decrease the trip distance of the first circuit breaker pole, while laser energy is applied to a trip structure of the second circuit breaker pole at a second surface to thermally induce displacement of the structure to increase the trip distance of the second circuit breaker pole. Each trip structure has both of the energy-receiving surfaces. Laser energy is selectively applied to those surfaces depending on the kind of calibration adjustment required. The energy-receiving surfaces are disposed on the same side of the respective trip structures. Thus, in a manufacturing assembly line, only one laser source and a single optical path are required to adjust trip mechanism calibration in one direction or the other.

As discussed above, the laser treated part of the trip structure is preferentially a lanced or pre-bent leg, for example, of the terminal element. Also, where the trip structure is located in a circuit breaker housing, the housing is provided a window located adjacent to the lanced or pre-bent portion of the trip structure to enable or facilitate the heat treatment of the lanced or pre-bent surface.

Where the trip structure is located in a circuit breaker housing, the application of the laser energy is effectuated by directing the laser energy through a window in the housing.

The laser energy may be directed to a plurality of mutually spaced spots in a predetermined region of the trip structure.

A bimetal trip mechanism of a circuit breaker comprises, in accordance with the present invention, a circuit breaker trip structure including a bimetal element and a terminal element connected to the bimetal element. A preselected target part of the trip structure is heat treated, for example, by laser energy, to deform the trip structure and thereby displace the bimetal element relative to the trip bar to calibrate the trip mechanism.

A method in accordance with the present invention for calibrating or adjusting the calibration of a circuit breaker trip mechanism is efficient and inexpensive. The trip structure may be simplified, for example, over designs which include a set screw. The calibration adjustment may be effectuated through robotic assembly line procedures. Since adjustment may be accomplished through a circuit breaker housing window from a single side of the circuit breakers, only a single laser source is necessary.

The laser calibration technique of the present invention is a non-tactile versatile method. Manufacturing is facilitated in that dimensions and tolerances can be set so that circuit breakers are manufactured to mean product specifications. Only those units deviating from the prescribed tolerances will be calibrated by the laser technique.

DESCRIPTION OF THE PREFERRED EMBODIMENTS

Figure 1:
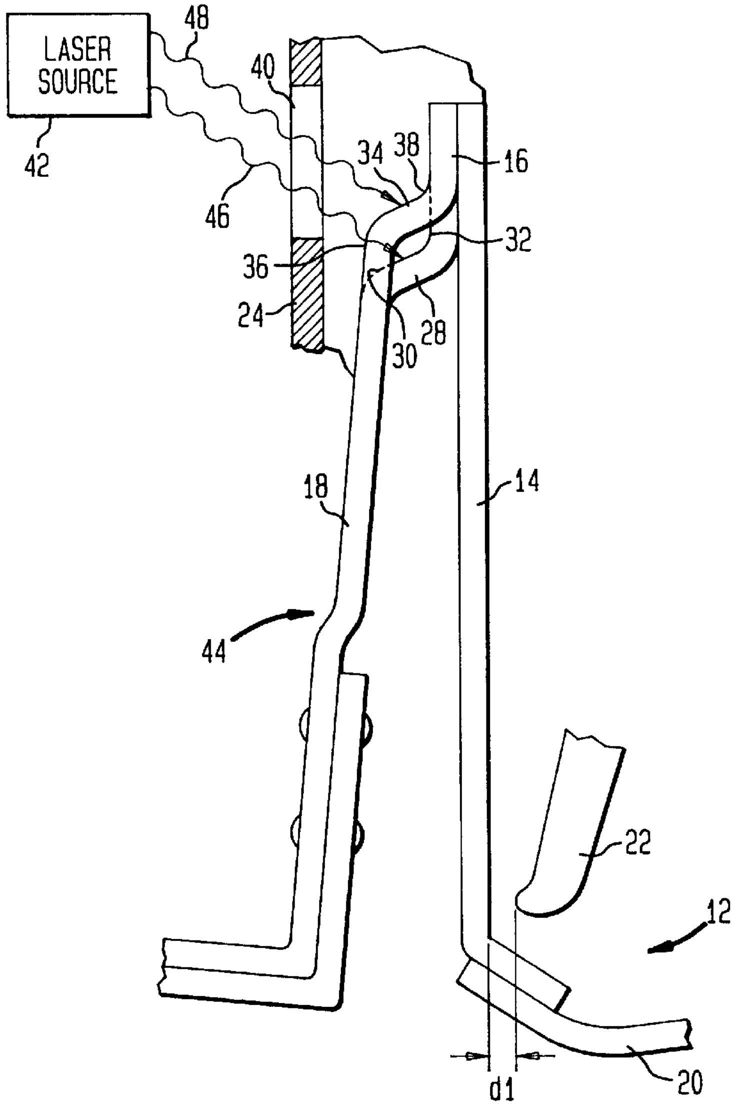
FIG. 1 is a side elevational view, on an enlarged scale, of a circuit breaker trip mechanism, showing a calibration method in accordance with the present invention.

FIG. 1 shows selected components of a circuit breaker trip mechanism 12 including a bimetal element 14 connected at one end to an end 16 of a terminal element 18 and at an opposite end to a braid extension 20. Proximate to braid extension 20, bimetal element 14 is spaced a trip distance d1 from a trip bar leg or extension 22. Trip bar leg 22 is part of a trip bar pivotably mounted to a circuit breaker housing 24.

Figure 2:
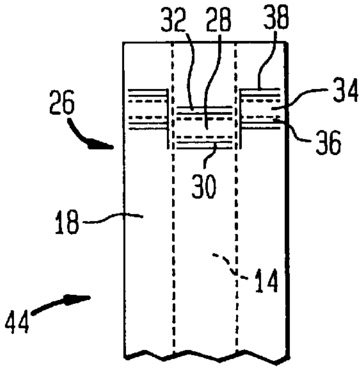
FIG. 2 is a partial front elevation of a terminal element and associated bimetal element shown in FIG. 1.

As illustrated in FIGS. 1 and 2, terminal element 18 is formed in a region about its end 16 with lanced or bent leg portions or surfaces 26. More particularly, terminal element 18 has a central area or leg 28 in the end region formed with a convex lanced or bent surface 30 and a concave lanced or bent surface 32. Flanking central leg 28 are a pair of lateral areas or legs 34 each formed with a convex lanced or bent surface 36 and a concave lanced or bent surface 38.

Circuit breaker housing 24 is provided in a region about terminal element surfaces 26 with a window 40 for facilitating the calibration of circuit breaker trip mechanism 12 using a laser source 42. Laser source 42 includes suitable optics and controls for directing a pulsed beam of laser energy to a desired location on terminal element 18. The application of laser energy thermally induces displacement of a trip structure 44 including bimetal element 14 and terminal element 18. The displacement of trip structure 44 and the concomitant displacement of bimetal element 14 particularly at the end thereof attached to braid extension 20 modifies trip distance d1 and accordingly alters the time delay between the onset of a current overload or other circuit fault and the tripping of the circuit breaker. Generally, it is contemplated that the application of the laser energy at least softens the material of the target region. During subsequent cooling and hardening of the target region, the target region contracts, which results in a change in the configuration and/or position of trip structure 44 and a concomitant change in trip distance d1.

As illustrated in FIG. 1, a beam of laser energy or radiation 46 is directed from laser source 42 through window 40 onto central leg portion 28 and particularly onto a straight section thereof located between convex surface 30 and concave surface 32, causing contraction of central leg portion 28. This contraction causes an angular change in terminal end 16 (since legs 34 are not affected) in the direction of increasing trip distance d1. To change the trip distance d1 in the other direction, a laser beam 48 is directed from laser source 42 through window 40 onto one or both lateral leg portions 34 and particularly onto straight sections thereof located between convex surface 36 and concave surface 38. An advantage of this method for calibrating a circuit breaker trip mechanism 12 is that the calibration action (the application of laser energy) is executed from the same direction of or on the same side of trip structure 44, regardless of whether the trip time is to be increased or decreased. It is contemplated that circuit breakers incorporating the trip mechanism 12 are assembled according to mean product specifications to produce a nominal value for trip distance d1. After assembly, calibration is effectuated as described herein.

Figure 1A:
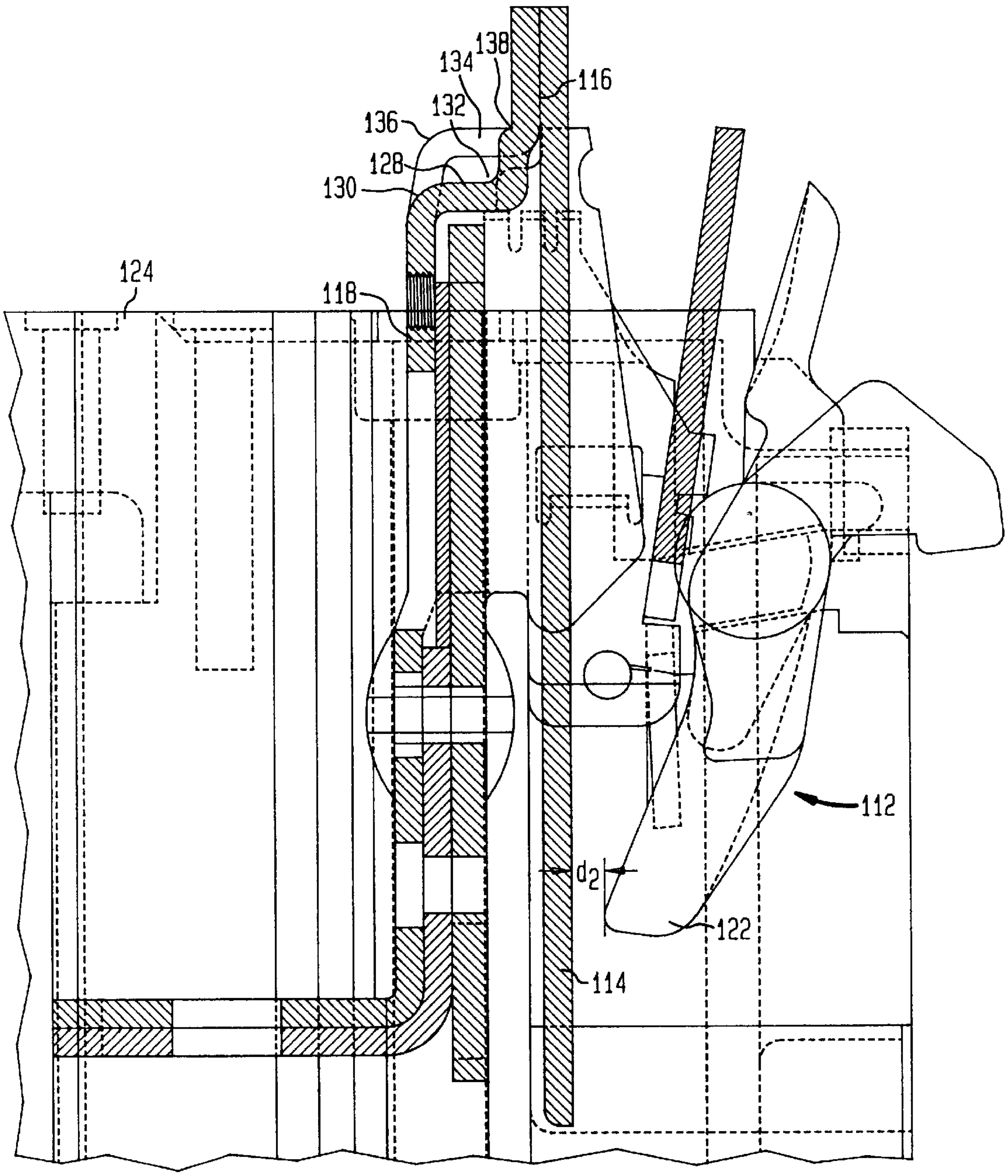
FIG. 1A is a cross-sectional view, taken along line $I_A$—$I_A$ in FIG. 2A, of another circuit breaker trip mechanism on which calibration method in accordance with the present invention is utilized, showing the position of the trip mechanism in relation to other, conventional, elements of a circuit breaker.

FIG. 1A shows selected components of another circuit breaker trip mechanism 112 which may be thermally calibrated by laser as described herein. Trip mechanism includes a bimetal element 114 connected at one end to an end 116 of a terminal element 118. Bimetal element 114 is spaced a trip distance d2 from a trip bar leg or extension 122. Trip bar 122 is a part of a trip bar pivotably mounted to a circuit breaker housing 124.

Figure 2A:
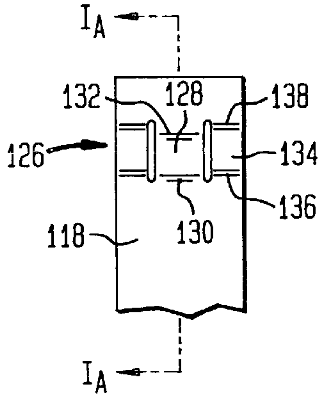
FIG. 2A is a partial front elevation of a terminal element shown in FIG. 1A.

As illustrated in FIGS. 1A and 2A, terminal element 118 is formed in a region about its end 116 with lanced or bent leg portions or surfaces 126. More particularly, terminal element 118 has a central area or leg 128 in the end region formed with a convex lanced or bent surface 130 and a concave lanced or bent surface 132. Flanking central leg 128 are a pair of lateral areas or legs 134 each formed with a convex lanced or bent surface 136 and a concave lanced or bent surface 138.

Figure 3A:
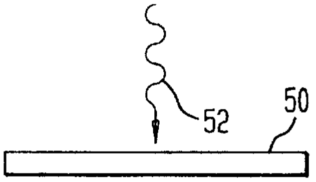
FIGS. 3A–3D are schematic side elevational views of a linear element, depicting successive steps in a laser treatment of that element.
Figure 3B:
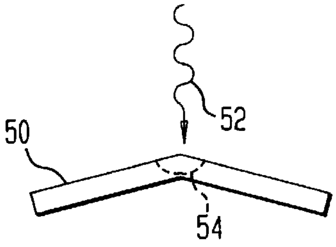
Figure 3C:
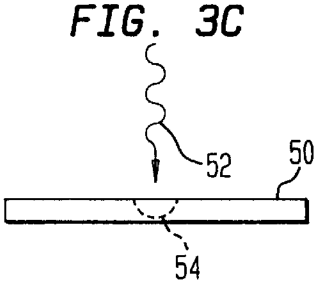
Figure 3D:
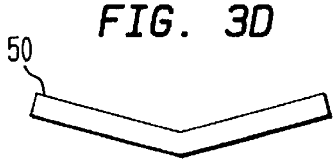

FIGS. 3A–3D represent successive steps in a laser implementation thermal heating process to effect bonding of a workpiece 50 exemplarily in the form of a strip or bar. When a laser beam 52 interacts with the workpiece 50, absorption of the beam causes the temperature of the workpiece to rise in a target region 54 about the point of impact of the laser beam 52. Depending on the interaction time, the surface of workpiece 50 in target region 54 heats up and expands, then softens and starts to melt. Due to the high intensity of the laser beam 52, a temperature gradient is generated as a function of depth into target region 54. This differential heating in conjunction with physical expansion initially causes workpiece 50 to bend at target region 54 (FIG. 3B). Subsequently, when the surface of workpiece 50 at region 54 softens or melts, reactive forces cause the workpiece to straighten, as illustrated in FIG. 3C. Switching off of laser beam 52 at that instant results in solidification and contraction of the locally heated area. As shown in FIG. 3D, workpiece 50 is bent towards laser beam 52 in target region 54 owing to shrinkage strain in the target region or interaction zone.

Figure 4:
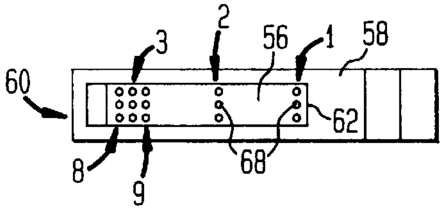
FIG. 4 is a rear elevational view of a terminal element and associated bimetal element of a circuit breaker, on a smaller scale than FIG. 2, showing a plurality of spot laser application sites in accordance with the invention.
Figure 5:
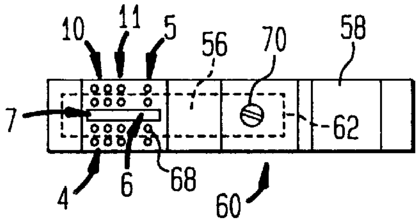
FIG. 5 is a front elevational view of the terminal element and associated bimetal element of FIG. 4, showing further spot laser application sites in accordance with the present invention.
Figure 5A:
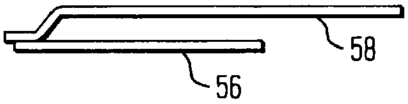
FIG. 5A is a side elevational view of the terminal element and associated bimetal element of FIGS. 4 and 5.
Figure 6:
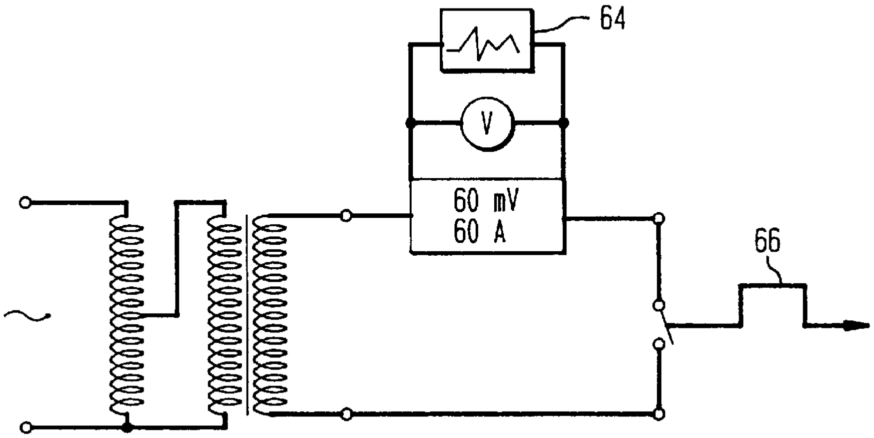
FIG. 6 is a circuit diagram of a measurement circuit used in testing bimetal position adjustment depending on laser target site.

Experiments have been carried out with laser energy being applied to high- and low-expansion sides of a bimetal element 56 and to an associated load terminal 58, illustrated in FIGS. 4, 5 and 5A. More specifically, pulsed laser radiation was applied to multiple target spots in interaction locations or zones 1, 2, 3, 8, and 9 on the low-expansion side of bimetal element 56, to multiple target spots in interaction locations or zones 4, 5, 10, and 11 on terminal element 58, and to multiple target spots in interaction locations or zones 6 and 7 on the high-expansion side of bimetal element 56. Using a Nd:Glass laser (LAG 10), calibration was accomplished by a point-by-point contraction in the focal spot of a laser beam. Displacement of the trip structure 60 including bimetal element 56 and terminal element 58 was detected with a dial gauge for measuring movement of a free end 62 of bimetal element 56. The reference of the measurement was located at the low-expansion side of the bimetal element 56. FIG. 6 depicts a circuit including an oscilloscope 64 for determining the switching behavior of a circuit breaker 66 incorporating the tested trip structure 60, testing being conducted with an overload current of 30 A. The high-expansion side of bimetal element 56 had a composition of 19.8% Ni, 2.25% Cr, and 78.35% Fe, while the low-expansion side had a composition of 36.0% Ni and 64% Fe.

The experiments were organized in two steps. Initially, the target regions or interaction zones with the maximum contraction were determined. Subsequently, calibration of the bimetal element 56 mounted in a housing (not shown) was determined. In determining the laser target regions or interaction zones having the maximum contraction, at least three laser target spots 68 (FIGS. 4 and 5) were made in each selected interaction zone 1–5 and 8–11. For a first specimen, the laser energy applied had the following specifications or parameters:

pulse duration: 5 ms
pulse energy Q: 15 J
lamp energy: 1.85 kV
beam expansion: 8 scale divisions
penetration depth: approx. 200 μm The results of testing on the first specimen are set forth in Table I, below.

TABLE I

| inter-action zone | 1 high exp. | 2 high exp. | 3 high exp. | 4 load term. | 5 load term. | 6 low exp. | 7 low exp. | 8 high exp. | 9 high exp. |
|---|---|---|---|---|---|---|---|---|---|
| bimetal tip move-ment (μm) | 90 | 140 | 360 | 370 | 160 | 30 | 40 | 340 | 280 |

For a second specimen tested for determining interaction zones with maximum contraction, the laser energy applied had the following specifications or parameters:

pulse duration: 15 ms
pulse energy Q: 32 J
lamp energy: 1.85 kV
beam expansion: 8 scale divisions
penetration depth: approx. 400 μm The results of testing on the first specimen are set forth in Table II, below.

TABLE II

| | 3 | 4 | 8 | 9 | 10 | 11 |
|---|---|---|---|---|---|---|
| inter-action zone | high exp. | load term. | high exp. | high exp. | load term. | load term. |
| bimetal tip move-ment (μm) | 520 | 560 | 510 | 480 | 520 | 520 |

Figure 7:
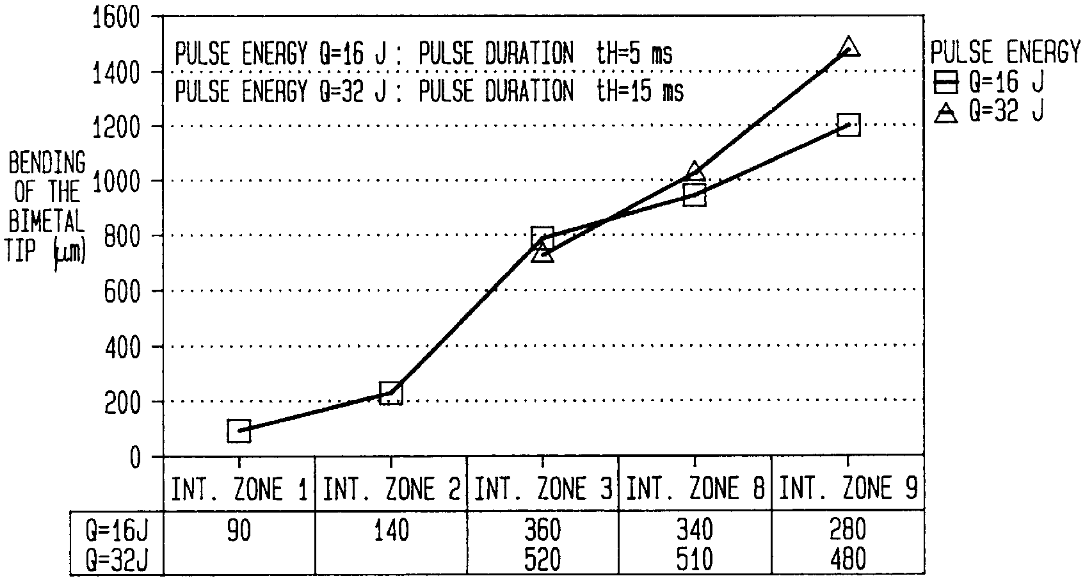
FIG. 7 is a graph showing displacement of a free end of a bimetal circuit breaker element in dependence on a location and amount of energy application.
Figure 8:
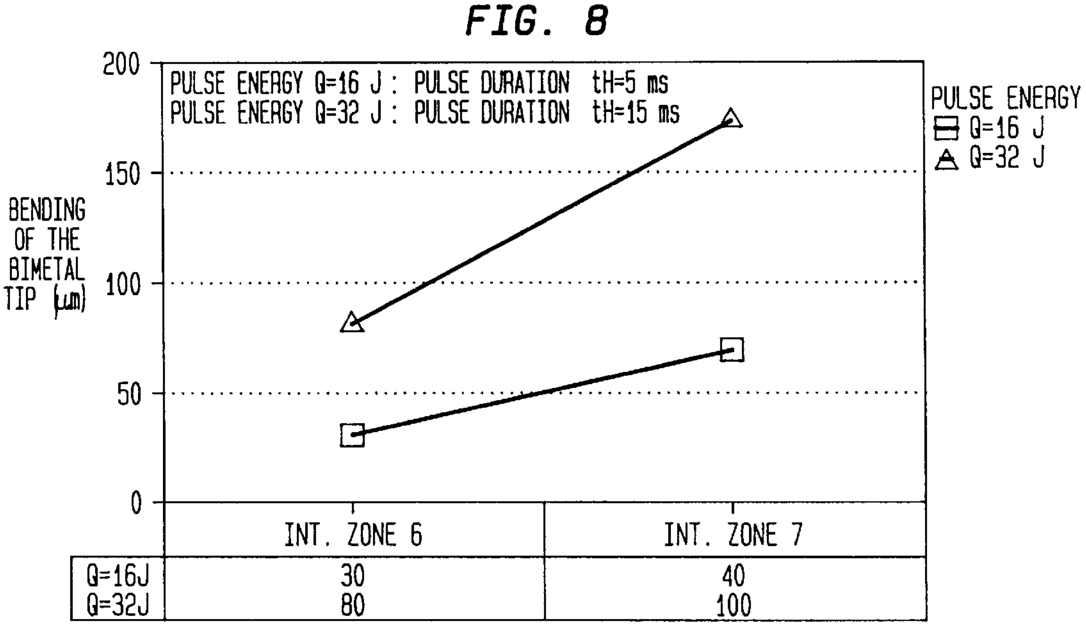
FIG. 8 is a graph similar to FIG. 7, showing further experimental results.
Figure 9:
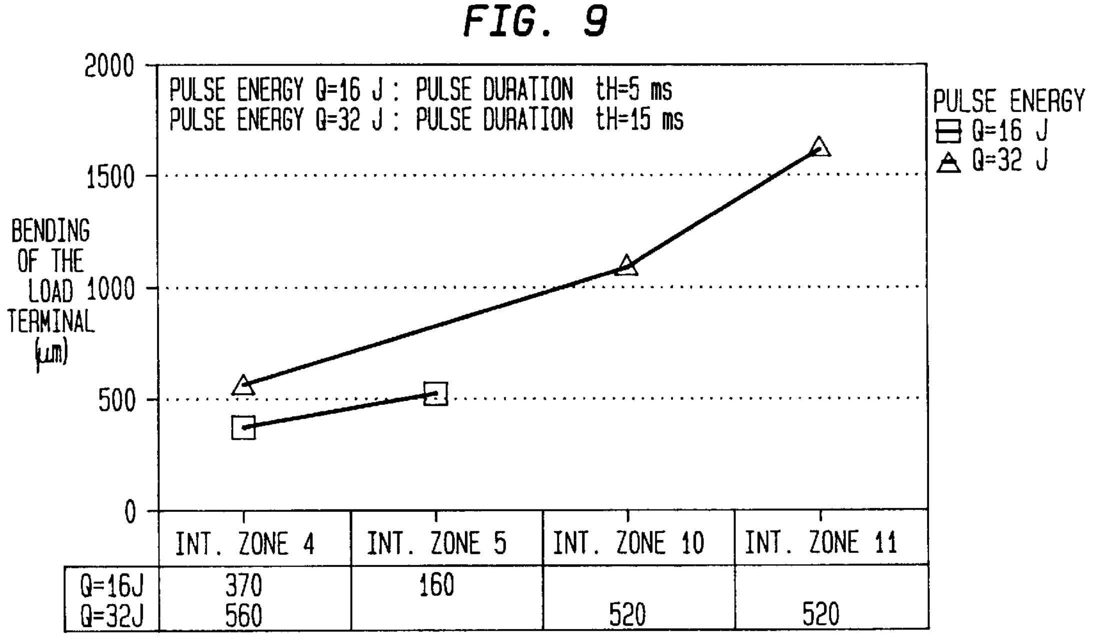
FIG. 9 is a graph similar to FIGS. 7 and 8, showing additional experimental results.

FIGS. 7, 8, and 9 are graphs which illustrate the influence of laser-mediated heat input on the displacement of bimetal element 56 where the laser energy is applied to the low-expansion side of the bimetal element, the high-expansion side of the bimetal element, and the load terminal 58, respectively.

The maximum displacement of the free end 62 of bimetal element 56 was 370 μm for the first specimen and 560 μm for the second specimen, obtained by application of laser radiation to interaction zone 4 (see FIG. 5). Doubled pulsed energy, as used on the second specimen, leads to an increase in displacement of more than 40% and in addition causes a doubled penetration depth of up to 400 μm.

In calibrating the switching behavior of the bimetal element in its housing, further investigations were concentrated on interaction zones 4, 10 and 11 located on load terminal 58 (FIG. 5). To ensure the accessibility of the laser beam to the load terminal, a window was cut into the circuit breaker housing (see FIG. 1). The initial state of the load terminal before laser machining was characterized at a temperature of 26° C. and an adjusting screw 70 (FIG. 5) was turned as far as possible without tripping the circuit breaker. For calibration, three laser spots 68 were made at each interaction zone, 4, 10, 11.

In a first experiment in calibrating switching behavior of the bimetal element, the laser energy applied had the following specifications or parameters:

pulse duration: 15 ms
pulse energy Q: 32 J
lamp energy: 1.85 kV
beam expansion: 8 scale divisions
penetration depth: approx. 400 μm The results are set forth in Table III, below.

TABLE III

| circuit breaker | initial state | average switching time t[s] of five measurements interaction zone 4 | interaction zones 4 and 10 | interaction zones 4, 10 and 11 |
|---|---|---|---|---|
| 1 | 5.9 | 24.1 | 38.0 | 44.0 |
| 2 | 5.9 | 22.5 | 34.3 | 49.0 |
| 3 | 6.0 | 23.2 | 31.2 | 41.4 |
| 4 | 6.0 | 20.8 | 31.5 | 40.9 |

With regard to the initial state and machining at interaction zone 4, it was found that the switching time can be extended by about 17 s. With regard to the initial state and machining at interaction zones 4 and 10, the switching time can be extended by about 28 s. With regard to the initial state and machining at interaction zones 4, 10, and 11, the switching time can be extended by about 38 s. The reproducibility of the switching time is guaranteed. Concerning the average switching time values, the maximum average switching time deviation is about 0.7 s.

In a second experiment in calibrating switching behavior of the bimetal element, the laser energy applied had the following specifications or parameters:

pulse duration: 15 ms pulse energy Q: 16 J lamp energy: 1.3 kV beam expansion: 8 scale divisions penetration depth: approx. 200 μm The results are set forth in Table IV, below.

TABLE IV

| circuit breaker | initial state | average switching time t[s] of five measurements interaction zone 4 | interaction zones 4 and 10 | interaction zones 4, 10 and 11 |
|---|---|---|---|---|
| 1 | 5 | 19 | 23 | 33 |
| 2 | 4 | 15 | 24 | 31 |
| 3 | 4 | 16 | 29 | 35 |

With regard to the initial state and machining at interaction zone 4, it was found that the switching time can be extended by about 12 s. With regard to the initial state and machining at interaction zones 4 and 10, the switching time can be extended by about 21 s. With regard to the initial state and machining at interaction zones 4, 10, and 11, the switching time can be extended by about 28 s.

Even thick components of industrial circuit breakers may be calibrated using a laser beam as described herein. The calibration depends on the laser beam energy, the pulse length, the number of pulses, and on the material of the trip structure.

Figure 10:
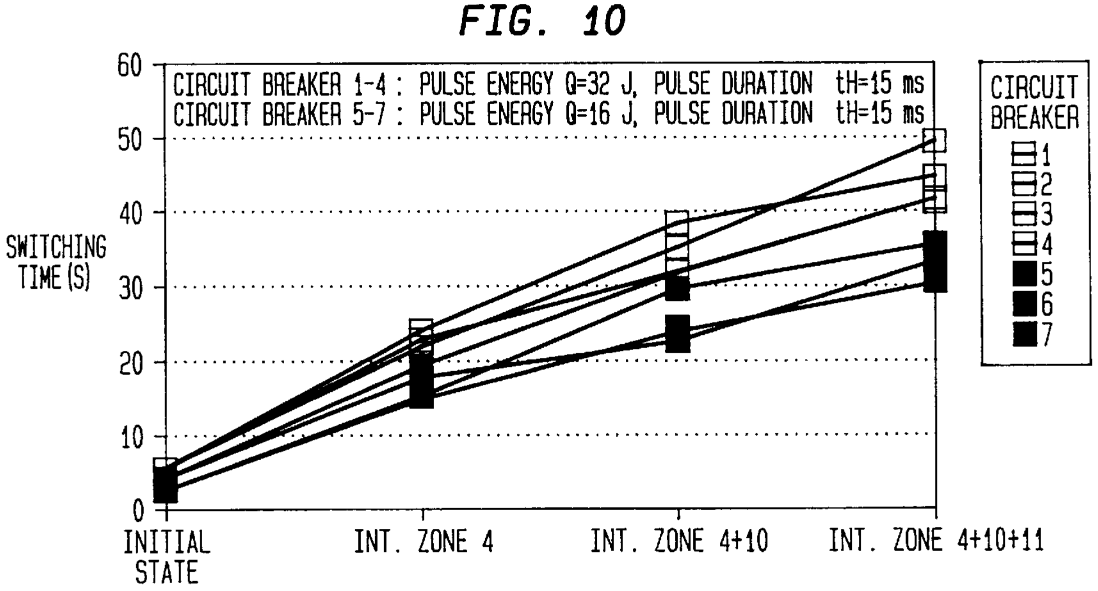
FIG. 10 is a graph showing effects of laser-implemented heating of circuit breaker trip elements on circuit breaker switching time.

FIG. 10 is a graph showing effects of heating on circuit breaker switching time.

It is to be noted that the free end of bimetal element 14 (FIGS. 1 and 2) is displaced away from trip bar 22 when laser beam 46 strikes leg portion 28 and is displaced towards trip bar 22 when laser bean 48 strikes leg 34. In the former case, leg portion 28 contracts upon cooling while legs 34 remain of fixed length, thereby causing a rotation of terminal end 16 in a clockwise direction as viewed in FIG. 1. Conversely, the application of laser beam 48 to legs 34 results in a contraction of those legs relative to leg portion 28, thereby inducing terminal end 16 to pivot in a counterclockwise direction.

In trip structure 60 (FIGS. 4, 5, 5A), displacement of bimetal element 56 results from bending of the respective element 56 or 58 at the point of laser application. Bending is induced by heating only a surface portion of bimetal element 56 or terminal element 58. The heated surface portion contracts upon cooling while the other side of the heated element does not contract. Where laser energy is targeted on zones 6 and 7 of bimetal element 56, the free end of the bimetal element moves towards the terminal element (trip distance typically increasing). Where laser energy is targeted on zones 4, 5, 10, or 11 of terminal element, the free end of the bimetal element moves away from the terminal element (trip distance typically decreasing).

Although the invention has been described in terms of particular embodiments and applications, one of ordinary skill in the art, in light of this teaching, can generate additional embodiments and modifications without departing from the spirit of or exceeding the scope of the claimed invention. For example, other sources of energy, such as ultrasonic waves or electrical current, could be used to apply concentrated heat to a trip structure. Accordingly, it is to be understood that the drawings and descriptions herein are proffered by way of example to facilitate comprehension of the invention and should not be construed to limit the scope thereof.

What is claimed is:

1. A method for adjusting the calibration of a bimetal trip mechanism of a circuit breaker, comprising:

providing a circuit breaker trip structure including a bimetal element and a terminal element connected to one another; and applying laser energy to said trip structure at a predetermined location thereon to thermally induce displacing of the trip structure and thereby modify a trip distance between said trip structure and a trip bar of the trip mechanism.

2. The method defined in claim 1 wherein said terminal element has lanced or pre-bent surfaces, the applying of said laser energy including directing said laser energy onto a preselected one of said lanced or pre-bent surfaces.

3. The method defined in claim 2 wherein said trip structure is located in a circuit breaker housing, the applying of said laser energy including directing said laser energy through a window in said housing.

4. The method defined in claim 3 wherein the applying of said laser energy includes directing said laser energy to a plurality of mutually spaced spots in a predetermined region of said trip structure.

5. The method defined in claim 1 wherein said predetermined location is one of two predetermined locations disposed on a common side of said trip structure, applying said laser energy to one of said predetermined locations producing a reduction in said trip distance, applying said laser energy to the other of said predetermined locations producing an increase in said trip distance.

6. The method defined in claim 5 wherein said terminal element has a lanced or pre-bent first surface and a plurality of lanced or pre-bent second surfaces disposed on opposite sides of said first surface, said second surfaces having a common shape, said one of said predetermined locations including said first surface, said other of said predetermined locations including one of said second surfaces.

7. The method defined in claim 1 wherein the applying of said laser energy includes heating a portion of said trip structure at said predetermined location sufficiently to soften said portion of said trip structure, the displaying of said trip structure occurring upon a contraction of said portion of said trip structure during a hardening thereof after said heating.

8. The method defined in claim 1 wherein said trip structure is located in a circuit breaker housing, the applying of said laser energy including directing said laser energy through a window in said housing.

9. The method defined in claim 1 wherein the applying of said laser energy includes directing said laser energy to a plurality of mutually spaced spots in a predetermined region of said trip structure.

10. A bimetal trip mechanism of a circuit breaker, comprising a circuit breaker trip structure including (1) a trip bar, (2) a bimetal element, and (3) a terminal element connected to said bimetal element, said trip bar being spaced a trip distance from said bimetal element, a preselected part of said trip structure being heat treated by laser energy to displace said bimetal element relative to said trip bar to calibrate said trip distance.

11. The trip mechanism defined in claim 10 wherein said terminal element has lanced or pre-bent surfaces, said preselected part of said trip structure being said lanced or pre-bent surfaces.

12. The trip mechanism defined in claim 11 wherein said trip structure is located in a circuit breaker housing, said housing having a window located adjacent to said lanced or pre-bent surfaces to facilitate the heat treatment of said lanced or pre-bent surfaces.

13. The trip mechanism defined in claim 12 wherein said preselected part of said trip structure includes a plurality of mutually spaced spots in a predetermined region of said trip structure, said mutually spaced spots being heat treated by said laser energy.

14. The trip mechanism defined in claim 10 wherein said trip structure is located in a circuit breaker housing, said housing having a window located adjacent to said preselected part of said trip structure to facilitate the heat treatment of said preselected part of said trip structure.

15. The trip mechanism defined in claim 10 wherein said preselected part of said trip structure includes a plurality of mutually spaced spots in a predetermined region of said trip structure, said mutually spaced spots being heat treated by said laser energy.

16. A bimetal trip mechanism of a circuit breaker, comprising a circuit breaker trip structure including (1) a bimetal element and (2) a terminal element connected to said bimetal element, said terminal element having lanced or pre-bent portions, a preselected part of said lanced or pre-bent portions being deformed by concentrated direct heating to displace said bimetal element relative to a trip bar to calibrate a trip distance between said trip bar and said bimetal element.

17. The trip mechanism defined in claim 16 wherein said lanced or pre-bent portions include a first leg and a plurality of commonly shaped second legs disposed on opposite sides of said first leg, said preselected part being on one of said first leg and said second legs, a change of said trip distance being effectuated in one direction where said preselected part is on said first leg and a change of said trip distance being effectuated in an opposite direction where said preselected part is on said second legs.

18. The trip mechanism defined in claim 16 wherein said trip structure is located in a circuit breaker housing, said housing having a window located adjacent to said lanced or pre-bent portions to facilitate the heat treatment of said lanced or pre-bent portions.

19. A bimetal trip mechanism of a circuit breaker, comprising a circuit breaker trip structure including (1) a bimetal element and (2) a terminal element connected to said bimetal element, one of said bimetal element and said terminal element having lanced or pre-bent portions, a preselected part of said lanced or pre-bent portions being deformed by laser heating to displace said bimetal element relative to a trip bar to calibrate a trip distance between said trip bar and said bimetal element.

20. The trip mechanism defined in claim 19 wherein said lanced or pre-bent portions include a first leg and a plurality of commonly shaped second legs disposed on opposite sides of said first leg, said preselected part being on one of said first leg and said second legs, a change of said trip distance being effectuated in one direction where said preselected part is on said first leg and a change of said trip distance being effectuated in an opposite direction where said preselected part is on said second legs.

21. The trip mechanism defined in claim 19 wherein said trip structure is located in a circuit breaker housing, said housing having a window located adjacent to said lanced or pre-bent portions to facilitate the heat treatment of said lanced or pre-bent portions.

22. A method for adjusting the calibration of a bimetal trip mechanism of a circuit breaker, comprising:

providing a circuit breaker trip structure including a bimetal element and a terminal element connected to one another; and applying laser energy to said trip structure at a predetermined location thereon to thermally induce bending of the trip structure and thereby modify a trip distance between said trip structure and a trip bar of the trip mechanism.

* * * * *